Sept. 6, 1949.   G. W. SPRENGER   2,481,360
INTERMITTENT MOTION MAGNETIC DRIVE
Filed July 21, 1948

Inventor:
George W. Sprenger,
by Browell S. Mack
His Attorney.

Patented Sept. 6, 1949

2,481,360

UNITED STATES PATENT OFFICE 2,481,360

INTERMITTENT MOTION MAGNETIC DRIVE

George W. Sprenger, Lynn, Mass., assignor to General Electric Company, a corporation of New York Application July 21, 1948, Serial No. 39,877

2 Claims. (Cl. 172—284)

My invention relates to a magnetic drive primarily for changing continuous rotary motion into intermittent rotary motion, the two rotary motions being in opposite directions.

Figure 2:
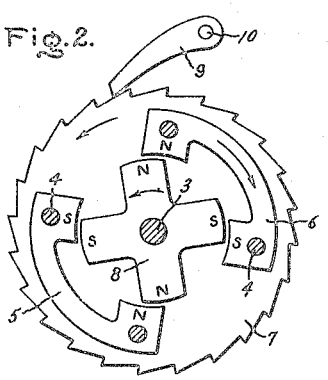
Figure 3:
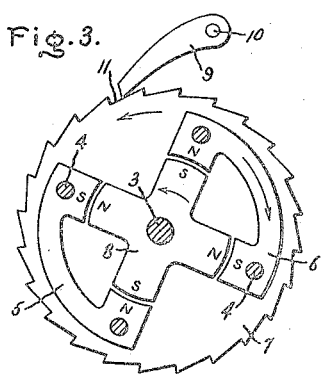

The features of my invention which are believed to be novel and patentable will be pointed out in the claims appended hereto. For a better understanding of my invention reference is made in the following description to the accompanying drawing in which Fig. 1 is a partially exploded perspective view of a drive mechanism embodying my invention and Figs. 2, 3, and 4 show the magnetic drive portions of the device of Fig. 1 in different relative operating positions to be explained.

Figure 1:
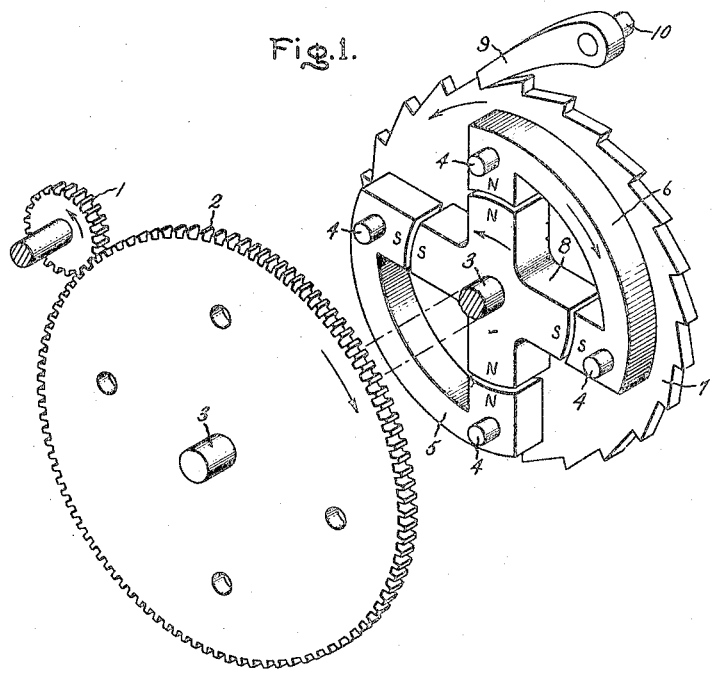

Referring to Fig. 1, a driving pinion 1 meshes with a gear 2 for driving the latter in a clockwise direction. Gear 2 is free to rotate on a shaft 3 and has fastened to its rear side by pins 4 or otherwise two magnets 5 and 6 which are preferably permanent magnets. In Fig. 1 the gear wheel 2 has been shown to the left of its preferred position in order better to show the magnetic drive parts. Ordinarily, magnets 5 and 6 will be mounted directly on the rear face of gear 2. On the same axis of rotation as gear wheel 2 there is a ratchet wheel 7 or its equivalent, and on the near side of which is secured a polar magnet 8 which is preferably a permanent magnet with its pole number corresponding to the number of poles in the two permanent magnets 5 and 6. The four poles of the two permanent magnets 5 and 6 project inwardly and are evenly spaced in a circle such that they may be aligned with the four poles of the permanent magnet 8 also arranged in a circle. These two permanent magnet systems or at least their pole pieces are relatively rotatable in cooperative relation as, for example, like the poles of the stator and rotor of a salient pole dynamoelectric machine. The shaft 3 may be stationary or may be fastened to and rotate with either gear wheel member 2 or with ratchet wheel 7 and magnet 8 member and serve as the bearing for the other member. Resting on the periphery of the ratchet wheel is a pawl 9 with its pivot 10 fixed to some stationary support. This pawl prevents clockwise rotation of ratchet wheel 7 and the magnet 8.

The permanent magnets are polarized as represented by the N and S designations on their pole pieces such that in each system there are an even number of pole pieces of alternate polarity such, for example, as two, four, six, etc. The operation may be described as follows: In Fig. 1 let it be assumed that gear 2 and its magnetic system 5 and 6 are being rotated in a clockwise direction. The other system cannot rotate clockwise because prevented by the ratchet and pawl arrangement. Hence, the pole pieces of the driving magnet system 5—6 will approach and align with the pole pieces of like polarity of the other system 8 as illustrated in Fig. 1, and create a magnetic repulsion force which first tries to drive magnet 8 clockwise and as the pole pieces pass beyond the aligned dead-center position represented in Fig. 1, then drives magnet 8 counterclockwise as represented in Fig. 2. The counterclockwise movement of magnet 8 and its ratchet wheel 7 is in the nature of a rotary jump action and quickly moves to the position represented in Fig. 3, not only due to the repulsion between like poles but also due to the attraction between unlike poles. This counterclockwise jump action of magnet 8 is arrested when unlike poles in the two magnet systems are in alignment. In the meantime the pawl 9 has passed over one or more ratchet teeth depending on their spacing. The continued rotation of magnet system 5—6 in a clockwise direction now attempts to drive magnet 8 with it and will do so to the extent permitted by any spacing of the nose of pawl 9 to the next ratchet tooth, indicated at 11 in Fig. 3. Hence, after a negligible clockwise rotation of magnet 8 it is blocked by the ratchet arrangement as represented in Fig. 4, and the continued clockwise rotation of the driving system 5—6 re-establishes, after one-fourth revolution, the dead center repulsion condition represented in Fig. 1 but with magnet 8 rotated one-half revolution counterclockwise with respect to magnets 5—6.

Figure 4:
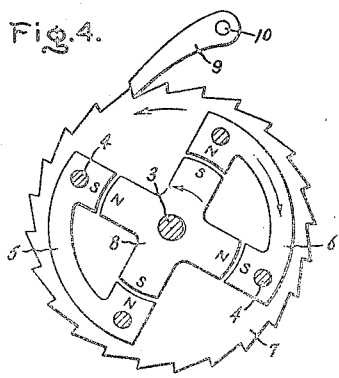

This next magnetic repulsion condition can be visualized by assuming gear 2 and its magnets 5 and 6 rotated one-fourth revolution clockwise from the position shown in Fig. 4 with magnet 8 remaining stationary. Thus the continuous rotation of gear wheel 2 and its magnet system in a clockwise direction is converted into an intermittent counterclockwise motion of magnet 8 and ratchet wheel 7. The relative speeds of such rotations will depend upon the inertia of ratchet wheel 7 and the load which it drives, the spacing of the ratchet teeth and the rate of rotation of gear wheel 2. In the four-pole arrangement illustrated the resultant counterclockwise jump movement of the ratchet wheel 7 cannot exceed one-fourth revolution, and generally will be somewhat less than this. The number of ratchet teeth should be in excess of the magnetic pole number. If the direction of rotation of gear wheel 2 be counterclockwise, ratchet wheel 7 will be driven counterclockwise at the same speed through the magnet system acting as a magnetic clutch, assuming the load does not exceed that which may be driven through such clutch.

Likewise, by lifting pawl 9 the ratchet wheel 7 may be driven clockwise with gear 2 through such clutch. Obviously, the ratchet wheel 7 may be the driving member and magnet 8 and gear wheel 2 the driven member. Various combinations of such drives may be used. Thus, gear wheel 2 may be operated intermittently in opposite directions, both such operations resulting in counterclockwise rotation of ratchet wheel 7. If ratchet wheel 7 has only one tooth, continuous clockwise rotation of gear 2 will produce an oscillatory motion of ratchet wheel 7 in opposite directions over something less than one-fourth revolution, the motion in the clockwise direction following that of gear 2 and the motion in the counterclockwise direction being a jump action previously described.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetic drive comprising driving and driven systems of magnets each having the same even number of pole pieces arranged in a circle with the pole pieces in each circle evenly spaced and with the two circles of pole pieces adjacent each other and relatively rotatable about a common axis such that the pole pieces in the two systems may magnetically cooperate with each other, the pole pieces in the two circles being polarized with alternate polarity, and a ratchet mechanism or its equivalent for limiting rotation of the driven magnetic systems in one direction.

2. A magnetic drive comprising a rotary driving member, a rotary driven member, magnet means on both members each having an even number of pole pieces arranged in a circle and evenly spaced and with alternate pole pieces polarized at opposite polarity, said members being rotatively mounted on the same axis of rotation passing through the centers of said circles of pole pieces and with the pole pieces on one member in magnetic cooperative relation to the pole pieces on the other member such that one member may drive the other by magnet forces, means for rotating the driving member in a given direction of rotation and a toothed ratchet wheel mechanism for limiting rotation of the driven member in said direction of rotation, the angular spacing between the teeth of said ratchet wheel being less than the angular spacing between the pole pieces of said magnetic drive.

GEORGE W. SPRENGER.

REFERENCES CITED

The following references are of record in the file of this patent:

UNITED STATES PATENTS

| Number | Name | Date |
|---|---|---|
| 606,258 | Whiting | June 28, 1898 |
| 2,241,983 | Connolly | May 13, 1941 |
| 2,393,671 | Wolfe | Jan. 29, 1946 |

FOREIGN PATENTS

| Number | Country | Date |
|---|---|---|
| 575,434 | France | Apr. 22, 1924 |